United States Patent

Nash et al.

[15] 3,676,607

[45] July 11, 1972

[54] PUSHBUTTON TELEPHONE DIAL

[72] Inventors: Donald H. Nash, Colts Neck; Theodore P. Nenninger, East Brunswick; Robert E. Prescott, Rumson, all of N.J.

[73] Assignee: Bell Telephone Laboratories, Incorporated, Murray Hill, Berkeley Heights, N.J.

[22] Filed: Nov. 25, 1969

[21] Appl. No.: 879,803

[52] U.S. Cl. ....................179/90 K, 340/365, 178/17 R

[51] Int. Cl. ....................H04m 1/50

[58] Field of Search ....................179/90 K, 90 CS, 90 BD; 178/17 R, 17 C; 235/145, 146; 197/98; 340/365; 200/5 A, 159 B, DIG. 1

[56] References Cited

UNITED STATES PATENTS

| | | | |
|---|---|---|---|
| 3,440,357 | 4/1969 | Broekhuysen | 179/90 BD |
| 3,340,401 | 9/1967 | Young | 197/98 |
| 3,293,640 | 12/1966 | Chalfin et al. | 340/365 |
| 3,281,541 | 10/1966 | Learner | 179/90 K |
| 3,244,369 | 4/1966 | Nassimbene | 235/145 |
| 3,129,418 | 4/1964 | De La Tour | 235/145 |
| 3,119,996 | 1/1964 | Comstock | 179/90 K |
| 3,017,463 | 1/1962 | Dinsmore et al. | 197/98 |
| 3,515,806 | 6/1970 | Spraker | 179/2 DP |
| 3,382,338 | 5/1968 | Arseneault | 200/159 B |
| 3,308,253 | 3/1967 | Krakinowski | 340/365 |

OTHER PUBLICATIONS

IBM Tech. Disclosure Magnetoresistive Contact- less switch, McDowell, Vol. 12, No. 3, August, 1969.

IBM Tech. Disclosure Non- Mechanical Keyboard, Sharp, Vol. 5, No. 12, May, 1963.

*Primary Examiner*—Kathleen H. Claffy
*Assistant Examiner*—Tom D'Amico
*Attorney*—R. J. Guenther and Edwin B. Cave

[57] ABSTRACT

This disclosure describes a telephone station dial having a compliant membrane supporting an array of pushbuttons. A conductive region on the membrane beneath each button contacts, on depression, printed circuit paths associated with two trigger circuits that in turn connect to a specific pair of multifrequency oscillator inputs. The trigger circuits comprise field effect transistors which provide a specified, unvarying output signal in response to the impedance change, either resistive or capacitive.

3 Claims, 7 Drawing Figures

INVENTORS: D. H. NASH
T. P. NENNINGER
R. E. PRESCOTT
BY Charles E. Graves
ATTORNEY

PUSHBUTTON TELEPHONE DIAL

FIELD OF THE INVENTION

This invention relates to telephonic communications and more specifically to station dial mechanisms and circuitry.

BACKGROUND OF THE INVENTION

Pushbutton-type telephone station dials consist especially of two main components: the contact closure mechanism, responsive to pressing of the buttons; and the tone generator which is selectively actuated thereby. The closure mechanism is typically an array of metal-to-metal spring contacts, one set for each button. Numerous arrangements of this sort are found in the art, one example being described in U.S. Pat. No. 3,316,357 to J. H. Ham et al. The tone generator consists of an oscillator with means to generate multiple discrete frequencies, usually two at a time. An example of the latter is found in U.S. Pat. No. 3,184,554 to L. A. Meacham.

Efforts to improve the reliability and performance of these dials, as well as reduce their cost, have focused on several points. One perennial problem with the spring contact closures for example, is their susceptibility to foreign particles. These can cause contact resistance high enough to generate false inputs to the oscillator, or to preclude altogether any input. A second problem is the relatively high cost of materials, such as gold, which go into the dial; and the high cost of assembly owing mainly to the numerous mechanical components and the often close tolerances on their various dimensions.

Given the wide range of environments in which telephone dials must function, the likelihood of excluding all particulate and/or other contaminants in an economical dial design has seemed remote, particularly since the conventional pushbutton dials are already costly.

Accordingly, the following are important objects of the invention:

to improve the reliability and performance of pushbutton-type telephone dialing systems;

to combat or counter the effect of foreign contaminants in the function of such dials, but in an economical manner; and to reduce the overall cost of such dials.

SUMMARY OF THE INVENTION

To assure long-term proper functioning of the tone generating oscillator in a multifrequency telephone dialing system, this invention contemplates using a trigger circuit, responsive to both resistive changes and capacitive changes, to energize the tone generators with a distinct and unvarying initiating signal.

In a particular embodiment, a trigger circuit is actuated by a unique compliant switch. Specifically, a depressible membrane with conductive paths serves the dual purpose of effecting (on depression) short circuit or ohmic contact with underlying conductive members when little or no contaminant matter is present; and if contaminant matter has intruded, depressing the membrane effects enough of a capacitive change to activate the trigger circuits. In either case, the latter's output is the same unvarying initiating signal to the appropriate input leads of the tone generator.

Advantageously, the trigger circuit comprises a trio of field effect transistors arranged to respond with the mentioned unvarying positive signal to resistive changes from infinity to a value of between 0 and 10K ohms; and also to capacitive changes of the order of 100 pF.

In a particular embodiment, the membrane is a unitary member of molded rubber with compliant conductive material selectively applied to one side. The membrane is mounted over an X-Y matrix of interior ribs molded into a frame through which the pushbuttons extend.

The invention and its further objects, features and advantages will be fully appreciated from a reading of the detailed description to follow of an illustrative embodiment thereof.

THE DRAWING

DETAILED DESCRIPTION OF AN ILLUSTRATIVE EMBODIMENT

Membrane Dial Structure

Figure 1:
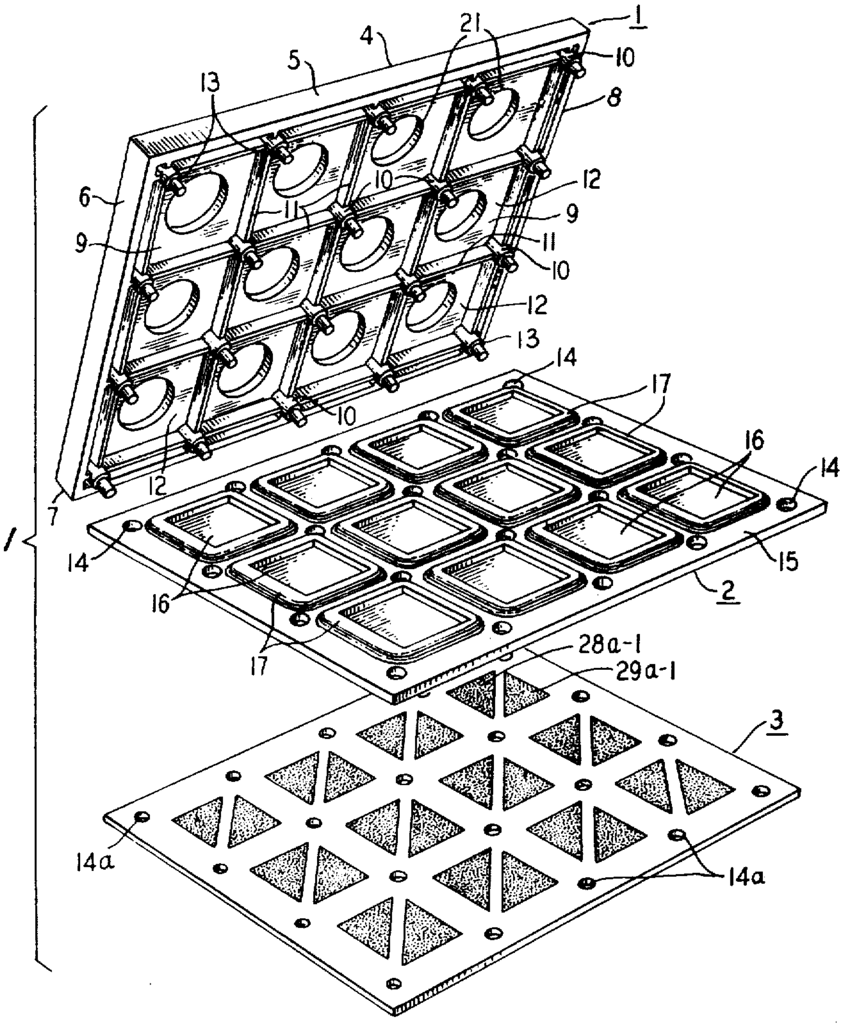
FIG. 1 is an exploded frontal perspective diagram of a telephone dial employing the present invention.

FIG. 1 shows an exploded view of the main mechanical dial elements consisting of a frame 1, a membrane 2 and a substrate 3 with printed circuit paths.

Figure 3:
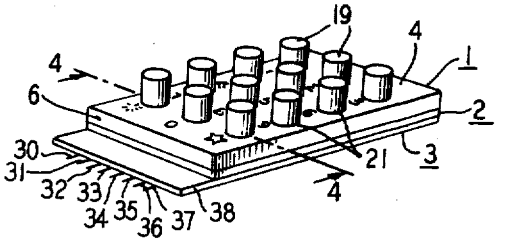
FIG. 3 is a frontal perspective view of an assembled dial.

The frame 1 is boxlike, having an exterior face 4 with alphanumeric characters such as in FIG. 3, and closed sides 5, 6, 7, 8. Extending from the interior face 9 are several columns—each designated 10—these being located at cross points of an X-Y matrix. In all, 20 columns 10 are shown, sufficing to provide mounting for a dial of ten or 12 buttons. The matrix itself is a rib system, each rib being designated 11, joining the columns 20 to create rectangular (i.e., square) recesses, each designated 12.

Figure 4:
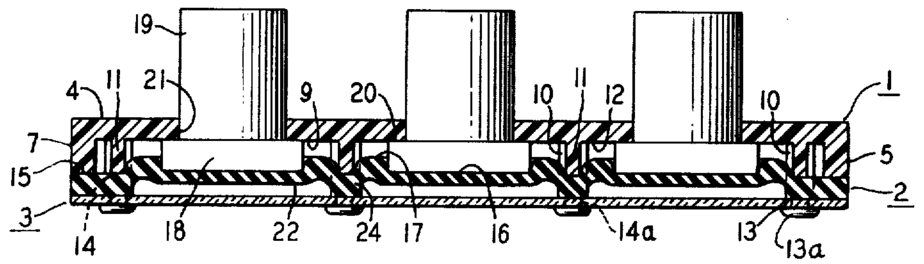
FIG. 4 is a side sectional view of the dial of FIG. 3.

Each column 10 has a shoulder 13. The membrane 2 has a pattern of holes 14 spaced to coincide with the columns 10. As shown in FIG. 4, the columns 10 engage the respective holes 14 in membrane 2. The ribs 11 are located below the shoulders 13, a distance about equal to the thickness of membrane 2. Thus, membrane 2 is laterally held by the columns 10, with the ribs 11 which define each recess 12 providing a thin-edge back support for the membrane 2.

Figure 2:
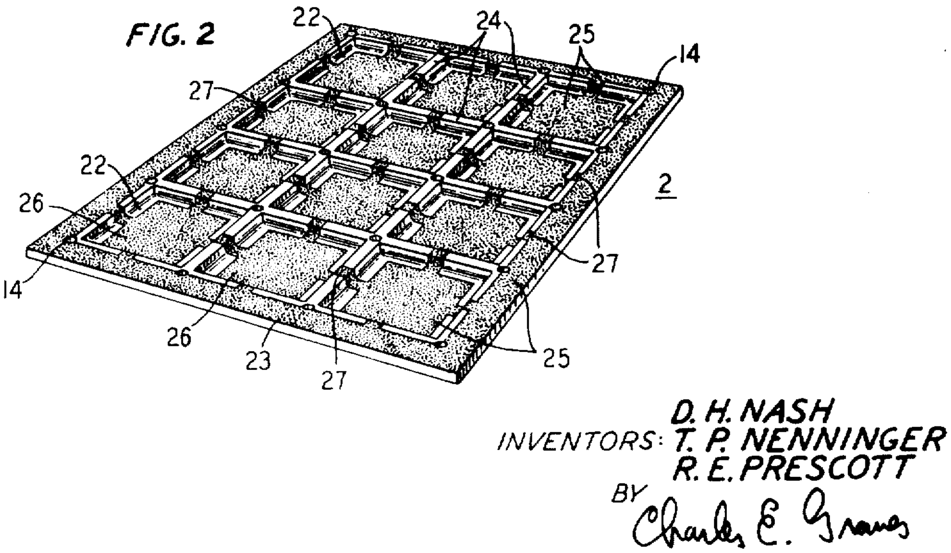
FIG. 2 is a front-bottom perspective view of a membrane employed in the dial.

The top of membrane 2 is shown in FIG. 1; and the opposite or bottom surface is shown in FIG. 2. The top, designated 15, includes several four-sided chamber 16 formed by ridges 17 which rise from top 15. The spaces between ridges 17, as well as the space along the edge of top 15, are contacted by the supportive ribs 11. The chambers 16 each receive a square base 18 of a pushbutton 19, as seen in FIG. 4. The height of base 18 is sufficient to bias the membrane 2, which forces the top shoulder 20 of base 18 against the interior face 9 of frame 1. The pushbuttons extend through holes 21 and out beyond exterior surface 4. The latter serves as a pushbutton dial faceplate on which alphanumeric characters are applied such as the numerals 0 through 9, the number symbol # and the asterisk * shown in FIG. 3.

If, as in FIG. 3, the extended portions of pushbuttons 19 are cross-sectionally round, the holes 21 are comparably shaped. In general the shape of holes 21 advantageously follow the cross-sectional shape of the pushbuttons 19 extended portion.

In FIG. 2, the bottom surface of membrane 2 comprises several recesses 22 bounded by peripheral edge 23 and interior ribs 24. Ribs 24 are positioned to align with the aforementioned spaces between the ridges 17; and the holes 14 occur at the ends and intersections of the ribs 24. The edge 23 is coplanar with the top surface of the ribs 24.

Conductive material, denoted 25 and shown in black in FIG. 2, is applied along the edge 23 and squarely in the bottom 26 of each recess 22. Conductive material denoted 27 placed over the ribs 24 connects the conductive bottoms 26 of all adjacent recesses 22, and also connects the outer recesses 22 to the conductive material along edge 23. Advantageously, this conductive material is, for example, an elastomer containing conductive material in particulate form sprayed 1 or 2 mils thick, having a sheet resistivity of 0.1 ohm/square when membrane 2 is unstretched. Alternatively, the conductive material is gold plated Mylar foil or silver coated molded sheet rubber.

As seen in FIG. 3, membrane 2, by virtue of its mounting arrangement and shape, does not undergo a tension condition on depression. The conducting surfaces therefore advantageously are not stretched in tension when the contacts are made. Further, the compliant nature of membrane 2 permits the embedding of at least some foreign particles without loss of ability to effect ohmic contact or capacitive change.

The substrate 3, depicted in FIG. 1, is fashioned of a ceramic, a phenolic resin or any other material capable of receiving thin film, printed, screened or otherwise—applied circuitry. The circuitry comprises land areas 28*a–l* and 29*a–l* disposed in pairs in each of the regions on the substrate surface that lie beneath the several conductive bottoms 26 of membrane recesses 22 when the dial components are assembled as in FIG. 3. Assembly is facilitated by engagement of the columns 13 bosses into the holes 14*a* of substrate 3, as in FIG. 4. Advantageously, the bosses are then ultrasonically headed over, as is boss 13a.

Figure 5:
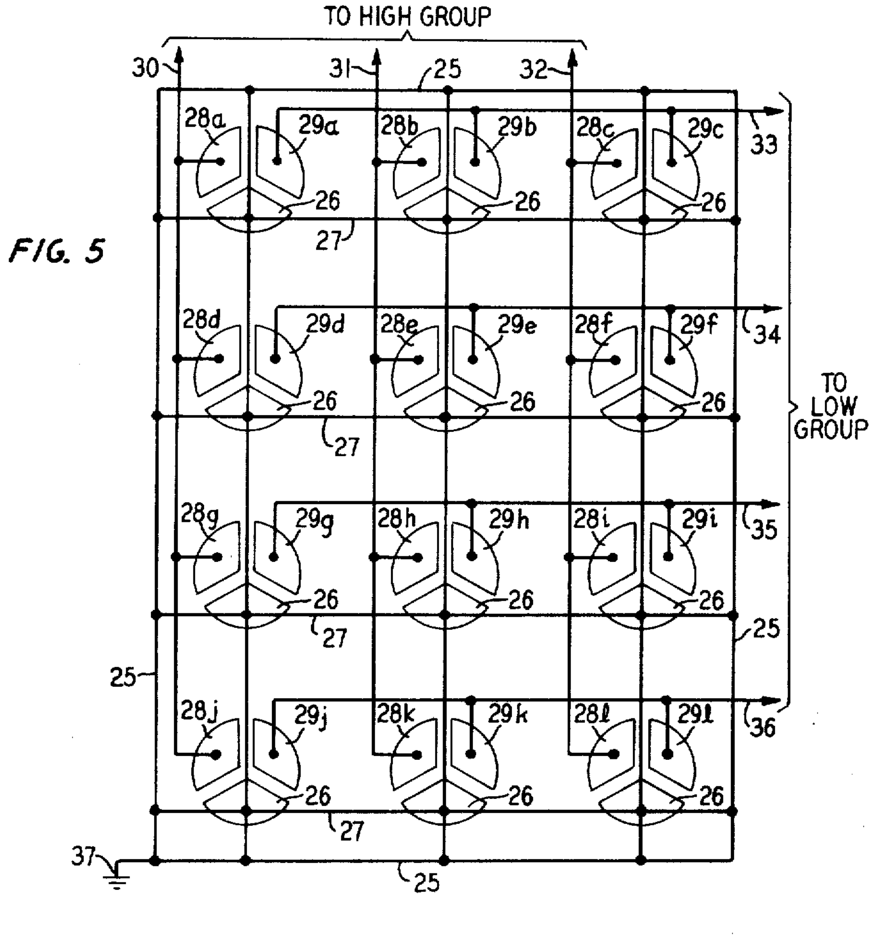
FIG. 5 is a circuit schematic of the conductive part of the membrane and its underlying substrate circuitry.

The manner of connecting the land areas and of bringing out leads therefrom is shown schematically in FIG. 5. The land areas 28*a–l* are associated with the "high" frequency group of tones, which will be later described; and the land areas 29*a–l* are associated with the "low" frequency group of tones. The land areas 28*a*, 28*d*, 28*g*, 28*j* are strapped to a common connection 30; and the land areas 28*b*, 28*e*, 28*h*, 28*j* and 28*c*, 28*f*, 28*i*, 28*l* are strapped respectively to common connections 31, 32. Similarly, the land areas 29*a*, 29*b*, 29*c* are strapped to common connection 33; land areas 29*d*, 29*e*, 29*f* are strapped to connection 34; land areas 29*g*, 29*h*, 29*i* are strapped to connection 35; and land areas 29*j*, 29*k*, 29*l* are strapped to connection 36.

Interconnection of the membrane's conductive bottoms 26 is achieved with the conductive material 27 placed over ribs 24 and connected to conductive material 25 placed along edge 23. The circuit path thus achieved is depicted in FIG. 5 by the corresponding numerals 25, 26, 27. The latter culminate in a common connector 37 to ground.

It will be understood that the strapping connections 30–36 described above are all effected within or upon the substrate 3. For clarity, these are not shown in the assembly drawing of FIG. 1 since the circuit schematic of FIG. 5 suffices to fully teach the structure of substrate 3. The connections 30–36 associated with the substrate land areas, and the connection 37 that is common to the conductive portions of membrane 2, are shown in FIG. 3 terminating at an extended edge 38 of the substrate 3.

Figures 6, 7:
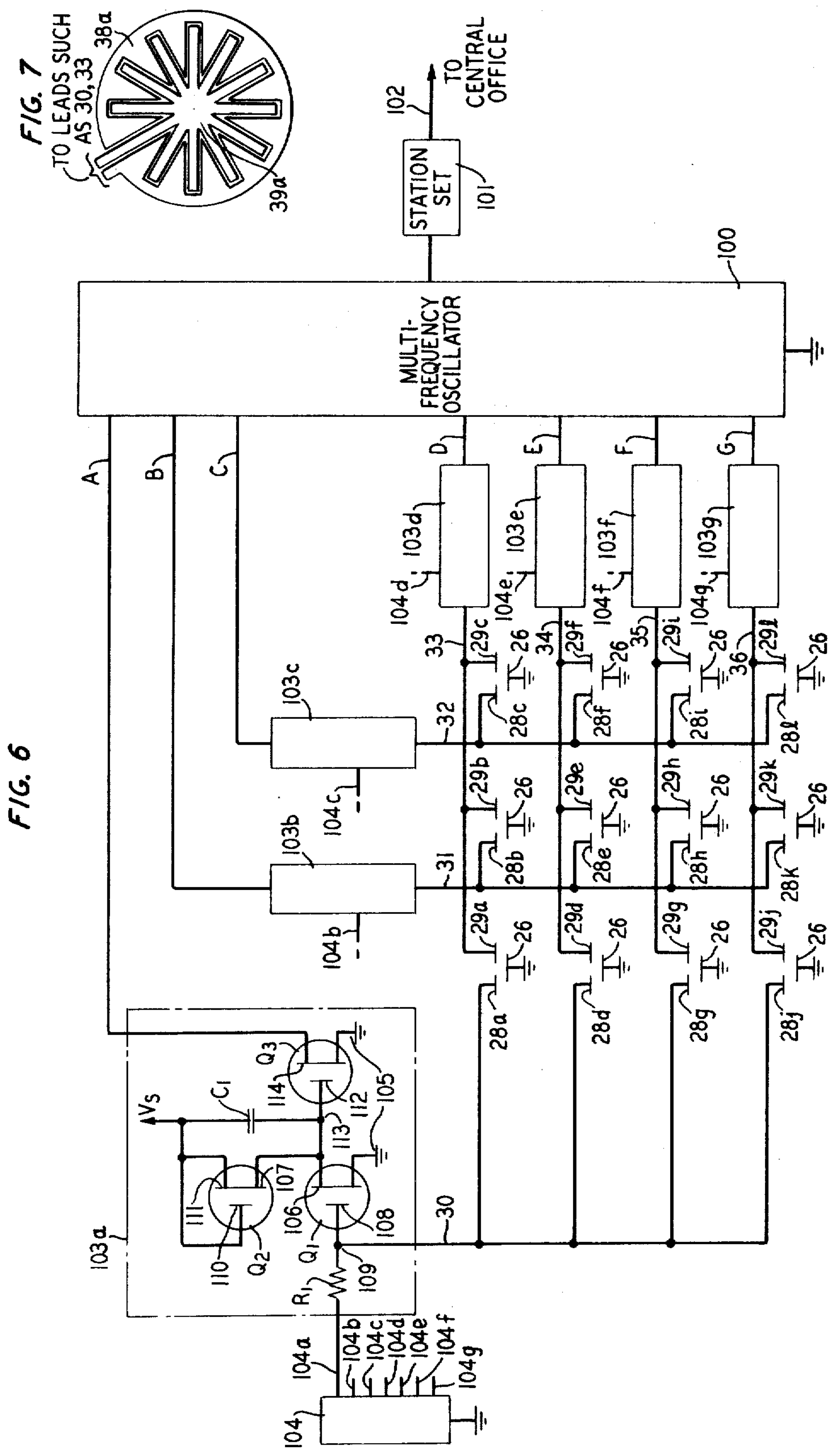
FIG. 6 is a circuit schematic showing the circuit of FIG. 5 and plural trigger circuits employed in the telephone plant.
FIG. 7 is a schematic top view of alternate land area shape.

Also, for simplicity's sake, the land areas 28*a–l*, 29*a–l* as well as the conductive bottoms 26 of the membrane 2 are shown as pie-shaped in FIG. 5: This is merely schematic. The criteria for shaping the land areas is to provide the largest possible pairs of equal-area lands beneath each membrane bottom 26. Accordingly, the triangular-shaped land areas shown in FIG. 1 are one embodiment. In a second such embodiment, the land areas are shaped in the form of two interleaved multifingered rosettes 38*a*, 39*a* as shown in FIG. 7. This configuration assures at least an ohmic contact if the forces acting on a button are not perpendicular to substrate 2.

DIAL CIRCUITRY

As seen in FIG. 6, a multifrequency oscillator 100 is connected through appropriate circuitry within a station set, such as 101, to tone receiving equipment (not shown) located at a central office through line 102. Oscillator 100 can be of the type described, for example, in aforementioned U.S. Pat. No. 3,184,554. Oscillator 100 generates several discrete frequencies which may, for example, be: 697, 770, 852, 941, 1209, 1336, and 1477 Hz. These frequencies are respectively produced in response to suitable signals on input leads A, B, C, D, E, F, G to oscillator 100. Said signals are generated in accordance with this invention by trigger circuits 103*a–g* shown in FIG. 6. The leads A–G to oscillator 100 are connected to the output leads of the trigger circuits 103*a–g*. The circuits 103*a–g* are all advantageously similar in structure to what is shown for circuit 103*a*. The latter will now be described.

Circuit 103*a* is driven by RF oscillator 104 oscillating at, for example, 100 kc/s. The oscillator 104 output is common, through the respective leads 104*a–g*, to the inputs of each of circuits 103*a–g*. Oscillator 104 works into a circuit including resistor $R_1$ and the series-connected land areas 28*a*, 28*d*, 28*g*, 28*j* each of which comprises a capacitor plate. As already described, each of these capacitor plates in the dial is opposed by one of the conductive bottoms 26 of membrane 2, all said bottoms 26 being at ground potential as shown in FIG. 5 and again in FIG. 6.

It is thus seen that the depressing of, for example, any one of the buttons "1", "4", "7", " # ", seen in FIG. 3 will depress the associated membrane conductive bottom 26 into actual contact with the two corresponding land areas. For example, depression of the "1" button pushes the associated button 26 down onto land area 28*a* and land area 29*a*, effecting a contact of substantially zero resistance, given clean surfaces and no contaminant matter thereinbetween. If, however, dust or other contaminants have intervened between the bottom and one of the land areas to prevent actual contact between the plates or to cause an ohmic contact of, for example, up to 10,000 Ω, depression still causes a large capacitive change between the land area 28*a* or 29*a*, and the corresponding bottom 26.

Circuit 103*a* includes, pursuant to one aspect of the invention a trio of field effect transistors (FETs) $Q_1$, $Q_2$, $Q_3$. The sources 105 of transistors $Q_1$ and $Q_3$ are connected to ground potential. Gate 108 of transistor $Q_1$ is connected to the common point 109 between resistor $R_1$ and (via lead 30) the serially connected land areas 28*a*, 28*d*, 28*g*, 28*j*. The gate 110 and drain 111 of transistor $Q_2$, as well as a first side of capacitor $C_1$ are connected in common to a power supply $V_s$. Gate 112 of transistor $Q_3$, the second side of capacitor $C_1$, drain 106 of transistor $Q_1$, and source 107 of transistor $Q_2$ are connected at common point 113. The source-drain path of transistor $Q_3$ is connected to input A of multifrequency oscillator 100.

Situation With no Buttons Depressed

Transistor $Q_1$ conducts when the voltage at its gate 108 is above its conduction threshold voltage; otherwise transistor $Q_1$ does not conduct. With none of the buttons "1", "4", "7", " # " depressed, the voltage supplied by oscillator 104 is sufficiently strong that when its positive output peaks exceed the conduction threshold of of transistor $Q_1$, it conducts for the peak duration. In this situation, the signal at drain 106 is held near ground potential by the action of capacitor $C_1$. During the conduction of transistor $Q_1$, a large current flows through capacitor $C_1$ to ground via transistor $Q_1$. Capacitor $C_1$ holds its charge until the next cycle. Transistor $Q_2$ does not conduct heavily during this time; it rather acts as a load resistor for transistor $Q_1$.

With the voltage at common point 113 near ground transistor $Q_3$ is nonconducting and accordingly, keeps the lead A of oscillator 100 essentially open-circuited.

Button Depressed

With depression of any one of the "1", "4", "7", " # ", the impedance between the conductive bottom 26 and the opposing land area (say, area 28*a*) changes from very high to low at the output frequency of oscillator 104.

This change occurs due to any of three causes: a good contact closure of essentially zero resistance, a poor (ohmic) contact—about 10 kΩ—between bottom 26 and the opposing land areas due to some kind of contaminants, or a capacitive increase between bottom 26 and the land areas.

Under any of these conditions, ac voltage peaks at gate 108 of transistor $Q_1$ are below threshold and $Q_1$ does not conduct at all. In such case, capacitor $C_1$ discharges through transistor $Q_2$, and voltage at common point 113 rises toward the supply voltage $V_s$. Finally, voltage at point 113 goes above the conduction threshold of transistor $Q_3$ causing it to turn on. A conductive path through ground is thereby produced for lead A. Suitable circuitry (not shown) within multifrequency oscillator 100 recognizes the resistive change and responds by energizing the appropriate tone generating circuit.

The on-off action of transistor $Q_3$ therefore follows the operation of any one of the four mentioned buttons, and specifically the impedance level at the said pushbutton switch. It has been determined that an operated capacitance of the order of 100 pF and a nonoperated capacitance of the order of 5 pF from the output lead to ground, i.e., across plates 28*a* and 26, for example, is acceptable.

It will readily be appreciated that the circuits 103*b–g* each function the same as does circuit 103*a*. Oscillator 104 can advantageously be connected as a common RF input to all circuits 103*a–g*, although such connection is not shown. The circuits 103*b–g* work with different ones of the land areas, the particular connections being found in FIG. 6 where the land area numeral designations remain the same as in FIG. 5.

Depression of any one button thus calls into play two of the trigger circuits. Thus, for example, depression of the dial button "1" energizes trigger circuit 103*a* as already described; and—by virtue of the concurrent contacting of land area 29*a* by bottom 26—depression also energizes trigger circuit 103*d*. Two inputs are thereby provided to multifrequency oscillator 100, which generates two tones representing a unique tonal pair corresponding to the button numeral "1". Obviously, the scheme is applicable to telephonic pushbutton dials having either fewer or greater total buttons. Further, if for any reason one or more of the buttons in a given matrix are to be omitted, the only circuit change necessary is omission of the substrate lands that normally would supply contacts for that button.

Field effect transistors are used in circuit 103*a* because of their low cost and inherent threshold voltage characteristics. It will be recognized that other detecting circuits can be substituted such as, for example, a Schmitt trigger. Also, refinements of the scheme include avoiding, with appropriate logic circuitry, false inputs to oscillator 100 such as might result if two buttons are pressed at once. Further, pulse stretching can be added to ensure response to the occasional very short-duration button depression.

The spirit of the invention is embraced in the scope of the claims to follow.

What is claimed is:

1. A telephone station dial comprising:

a multifrequency tone generator having plural input paths each for receiving an initiating signal to generate a tone, a plurality of detector circuits and an RF oscillator connected to each said detector circuit, a control circuit connected between said source and and each said detector circuit, each control circuit comprising a rigid fixed capacitor plate and a movable compliant capacitor plate, means including a pushbutton for bringing each said movable plate toward and, when unobstructed, into contact with, the corresponding fixed plate thereby to effect a sufficient impedance change in said control circuit to cause said threshold value to be exceeded, and each said detector circuit comprising first, second and third FETs each having gate, source and drain electrodes; said first FET gate connected to said oscillator output; a capacitor connected across said second FET to a bias voltage source; said first FET drain, said second FET source, said third FET gate and said capacitor being commonly connected; means serially connecting said third FET source and drain electrodes in a selected said tone generator path: means driving said oscillator output voltage peaks above the threshold voltage of said first FET when the associated said button is undepressed, and below said threshold when sufficiently depressed; and means including said capacitor responsive to the latter condition for driving said third FET gate above its threshold, thereby to apply said initiating signal to said path.

2. A telephone station dial comprising:

a multifrequency tone generator having plural input connections each for receiving an initiating signal to generate a different, discrete tone;

a like plurality of trigger circuits, each responsive to external impedance changes for producing a control signal for application to an associated one of said input connections;

a plurality of pushbuttons;

a membrane with plural regions of conductive surface, said pushbuttons being respectively disposed above each said membrane region;

a substrate underlying said membrane, normally separated therefrom with unobstructed space thereinbetween, said substrate having one or more conductive zones opposite each said membrane region;

means connecting each said substrate zone to a selected one of said trigger circuits;

a frame with a 4-sided interior having an X-Y matrix of ribs, defining a pattern of rectangular recesses, each recess having an orifice, a pattern of pins extending outwardly from the intersecting points and ends of said ribs; and a hold pattern in said membrane corresponding to said pin pattern, said membrane being mounted through its said holes onto said pins.

3. A telephone dial in accordance with claim 2, wherein said membrane further comprises means for grippably mounting one of said pushbuttons onto the membrane region adjacent each said recess, the pushbutton top being biased through said orifice by said membrane.

* * * * *